United States Patent
Piccinini et al.

(10) Patent No.: US 8,856,348 B2
(45) Date of Patent: Oct. 7, 2014

(54) ON-DEMAND NETWORK CONNECTION

(75) Inventors: Sandro Piccinini, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 12/348,347

(22) Filed: Jan. 5, 2009

(65) Prior Publication Data

US 2010/0174816 A1 Jul. 8, 2010

(51) Int. Cl.
*G06F 15/16* (2006.01)
*H04L 12/28* (2006.01)

(52) U.S. Cl.
CPC ........ *H04L 12/2859* (2013.01); *H04L 12/2896* (2013.01)
USPC ....................................................... 709/227

(58) Field of Classification Search
CPC ......................... H01L 12/2859; H01L 12/2896
USPC ....................................................... 709/227
See application file for complete search history.

(56) References Cited

U.S. PATENT DOCUMENTS

| 5,774,655 | A | * | 6/1998 | Bloem et al. | 709/220 |
| 6,151,629 | A | | 11/2000 | Trewitt | |
| 6,425,000 | B1 | * | 7/2002 | Carmello et al. | 709/217 |
| 6,711,610 | B1 | * | 3/2004 | Harris | 709/217 |
| 6,785,724 | B1 | * | 8/2004 | Drainville et al. | 709/227 |
| 2005/0097190 | A1 | * | 5/2005 | Abdelhak | 709/217 |
| 2005/0198261 | A1 | * | 9/2005 | Durvasula et al. | 709/224 |
| 2009/0300199 | A1 | * | 12/2009 | Burns et al. | 709/230 |

FOREIGN PATENT DOCUMENTS

WO   WO 01/15397 A1   3/2001

\* cited by examiner

*Primary Examiner* — Boris Gorney
(74) *Attorney, Agent, or Firm* — Francis Lammes; Stephen J. Walder, Jr.; Libby Z. Toub (57) ABSTRACT

An on-demand network connection for a remote user is provided. Responsive to a failure to receive an electronic communication via an established network connection, a remote user device receives a connection request that indicates that the on-demand network connection is to be established. Responsive to receiving the connection request, the on-demand network connection is established from the remote user device to a network. Then, the electronic communication is received on the remote user device via the on-demand network connection.

20 Claims, 4 Drawing Sheets

ON-DEMAND NETWORK CONNECTION

BACKGROUND OF THE INVENTION

1. Field of the Invention

The present application relates generally to an improved data processing apparatus and method and more specifically to an apparatus and method for a network connection that connects on-demand.

2. Background of the Invention

Telecommuting, e-commuting, e-work, telework, working at home (WAH), or working from home (WFH) is a work arrangement in which employees enjoy flexibility in working location and hours. In other words, the daily commute to a central place of work is replaced by telecommunication links. Many work from home, while others, occasionally also referred to as nomad workers or web commuters utilize mobile telecommunications technology to work from coffee shops or myriad other locations.

Telecommuting is facilitated by tools such as virtual private networks, videoconferencing, Voice over IP, or the like, all of which require some type of network connection including the Internet. Telecommuting may be efficient and useful for companies as telecommuting allows staff and workers to communicate over a large distance, saving significant amounts of travel time and cost. As broadband network connections become more commonplace, more and more workers have enough bandwidth at home to use these tools to link their home office to their corporate intranet and internal phone networks.

However, in some circumstances, telecommuting implies the need to connect to the company Intranet, or to the Internet, just to be available to the colleagues on the chat. Currently, even for discontinuous usage of the network, a remote worker must be permanently connected via the network connection and consequently pay for the flat connection. Additionally, the capability for the remote worker to be reached on the phone depends on whether the contacting party knows the remote worker's contact information other than an office number, such as home phone numbers, cellular phone numbers, or the like.

Thus, working remotely provides negative effects through unnecessary costs and bandwidth waste, or, in case the network connection is not guaranteed, an employee limited availability.

BRIEF SUMMARY OF THE INVENTION

In one illustrative embodiment, a method, in a data processing system, is provided for establishing an on-demand network connection on a remote user device for a remote user. The illustrative embodiment receives a connection request, in the remote user device, that indicates that an on-demand network connection is to be established in response to a failure to receive an electronic communication via an established network connection. The illustrative embodiment establishes the on-demand network connection from the remote user device to a network in response to receiving the connection request. The illustrative embodiment receives the electronic communication on the remote user device via the on-demand network connection.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for determining an actual need of a network connection and establishing the network connection according to predetermined policies and characteristics for a remote worker. For example, the predetermined policies that may establish an on-demand network connection may be: each time a contacting user attempts to electronically chat with the remote worker, an urgent email has been sent to an electronic mailbox of the remote worker, an electronic communication for the remote worker is marked in a configurable way, a phone call is received at office phone of the remote worker, or the like. In such cases, the on-demand connection mechanism will trigger a network connection to be established from the remote worker's computing device since a business need requires the remote worker be network connected.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments leverage instrumented company servers to establish a mechanism that provides remote workers with various capabilities to receive notifications that establish a network connection. The notifications may be defined by the remote worker or according to company policies for defining the rules to drive the notification issuing a connection request or directly providing the network connection start-up. The notification may be initiated by electronic communications coming into an email system, instant messaging system, private branch exchange system, or the like. If the remote worker is not reachable directly from one of these systems, the systems may communicate directly with a company server, which may then recognize those incoming electronic communications as being directed to a person who is working remotely and is not currently connected through a network connection. The company server may then initialize a notification to the user to connect to the network, through a communication device.

Figure 1:
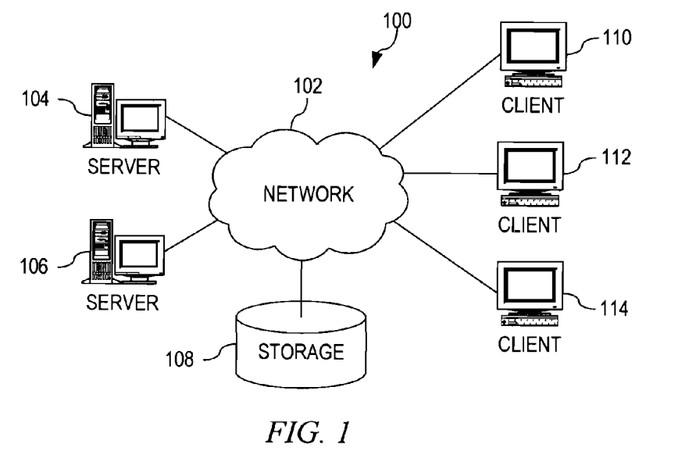
FIG. 1 depicts a pictorial representation of an example distributed data processing system in which aspects of the illustrative embodiments may be implemented.
Figure 2:
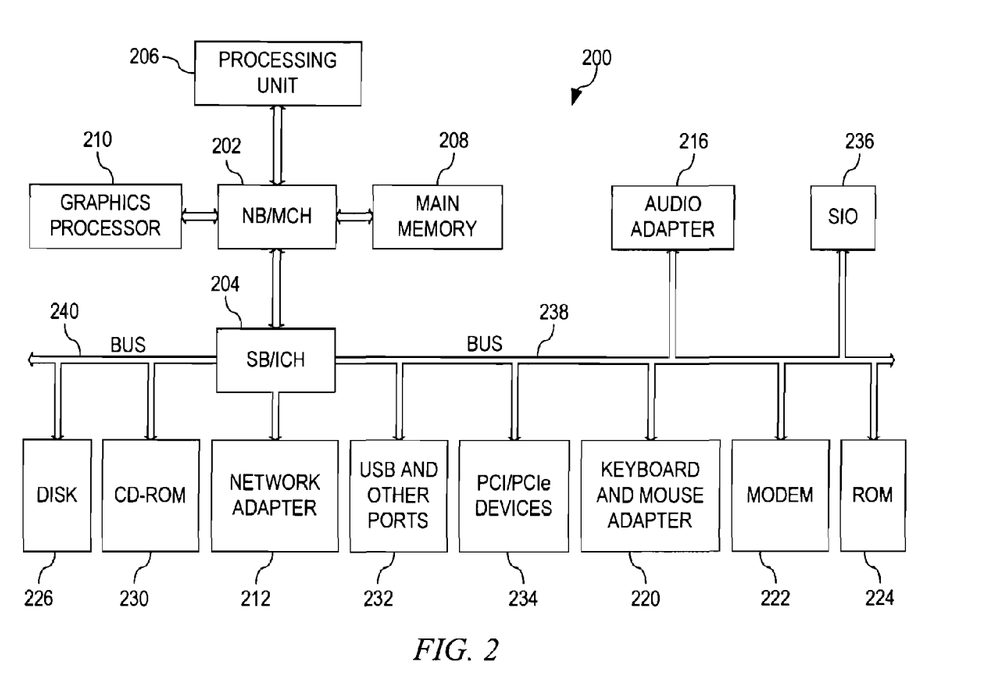
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of an on-demand network connection mechanism, this is only an example and is not intended to state or imply any limitation with regard to the features of the present invention. To the contrary, the illustrative embodiments are intended to include distributed data processing environments and embodiments in which a network connection may be established on-demand when required.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a mechanism for determining an actual need of a network connection and establishing the network connection according to predetermined policies and characteristics for a remote worker. An on-demand network connection may be established when an instrumented company server receives an electronic communication for the remote worker and the remote worker is not currently connected via a network connection. In such cases, the on-demand connection mechanism will trigger a network connection to be established from the remote worker's computing device.

Figure 3:
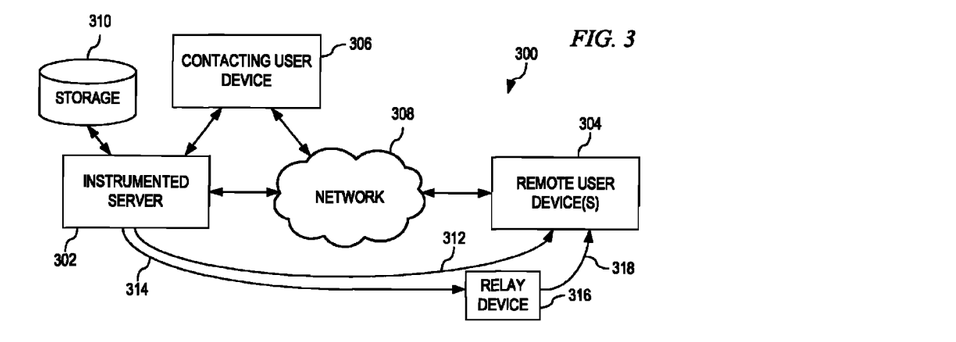
FIG. 3 depicts an example of a functional block diagram of an on-demand network connection mechanism in accordance with and illustrative embodiment.

FIG. 3 depicts an example of a functional block diagram of an on-demand network connection mechanism in accordance with and illustrative embodiment. On-demand network connection mechanism comprises instrumented server 302, remote user device 304, and contacting user device 306. When a user using contacting user device 306 attempts to contact a remote user, contacting user device 306 sends a communication signal to remote user device 304 either directly through network 308 or indirectly through instrumented server 302 in order to establish a communication link with the remote user. Network 308 may include connections, such as wire, wireless communication links, or fiber optic cables as well as other interim devices such as email systems, instant messaging systems, private branch exchange systems, or the like. If in attempting to contact the remote user, contacting user device 306 is unable to establish the communication link with the remote user device 304 because remote user device 304 is not connected to network 308, the illustrative embodiment provides instrumented server 302.

When contacting user device 306 is unable to establish the communication link directly with remote user device 304, instrumented server 302 receives a notification from contacting user device 306. The notification may be based upon the contacting user: attempting to electronically chat with the remote worker, sending an urgent email to an electronic mailbox of the remote worker, marking an electronic communication for the remote worker in a configurable way, calling the office phone of the remote worker, or the like. Alternatively, if contacting user device is unable to establish the communication link indirectly through instrumented server 302, instrumented server 302 may already be aware that the communication link could not be established. Based on an on-demand network connection registration of the remote user either by the remote user or according to policies established for the remote user, instrumented server 302 may send a connection request to remote user device 304 in order that remote user device 304 establish an on-demand connection.

The on-demand network connection registration of the remote user may include settings, set either by the remote user or according to the policies, for conditions when the on-demand network connection is to be implemented. The settings may indicate the types of notification that cause the on-demand network connection to be established, such as the electronic communication originating from a list of contacting users, the electronic communication meets a predetermined level of urgency, the electronic communication is received within a predetermined time period, the electronic communication includes a file with a pre-identified name, or the like. Additionally, the remote user may be required to provide an indication to instrumented server 302 that the remote user is reachable "on-demand." Instrumented server 302 may store the registration, settings, and indication in storage 310.

If instrumented server 302 receives a notification from contacting user device 306, instrumented server 302 determines if the remote user has indicated that the remote user is reachable "on-demand." If the remote user is reachable "on-demand", instrumented server 302 determines if the notification received from the contacting user device meets the requirements to establish an on-demand connection based on the setting for the remote user. If the remote user is not reachable "on-demand" or if the notification received from contacting user device 306 does not meet the requirements to establish an on-demand connection, then instrumented server 302 may send a notification back to contacting user device 306 that indicates the remote user cannot be contacted.

If the remote user is reachable "on-demand" and the notification received from contacting user device 306 meets the requirements to establish an on-demand connection, instrumented server 302 may send a response notification back to contacting user device 306 that indicates that the remote user is reachable "on-demand" and a request to establish the on-demand connection is being sent to the remote user. Instrumented server 302 then sends a connection request to remote user device 304 in order to establish an on-demand connection. Instrumented server 302 may send the connection request directly via connection 312 to remote user device 304 if remote user device is capable of connecting to the Internet, Intranet, or the like, or, if remote user device 304 is not a device that is capable of communicating directly with contacting user device 306 through network 308, instrumented server 302 may send the connection request via connection 314 to relay device 316, such as a cellular phone, landline, pager, or the like, that is capable of communicating with remote user device 304 via connection 318, which may be a wired connection, wireless connection, or other connection means. While the illustrative embodiment depicts connections 312, 314, and 318 as wireless connections, such as a cellular telephone connection, one of ordinary skill in the art would recognize that other communication methods may be used without departing from the spirit and scope of the invention.

For example, if remote user device 304 is a cell phone that is capable of connection to the Internet, Intranet, or the like, instrumented server 302 may send the connection request directly to the cell phone. However, as another example, if remote user device is a laptop computing device that does not have direct communication with instrumented server 302, then instrumented server 302 could send the communication request to relay device 316, such as a pager of the remote user. Then, the pager could communicate via a connection, for example using Bluetooth®. Wireless Application Protocol (WAP), cable, or the like, to the remote user device 304. Once remote user device 304 receives the communication request from the instrumented server 302, either directly or indirectly, remote user device 304 may then automatically establish an on-demand network connection to network 308 or display a notification to the remote user that indicates that a network connection needs to be established and, in response to the remote user acknowledging the notification, remote user device 304 establishes the on-demand network connection. The notification displayed to the remote user on remote user device 304 may indicate the details of the communication associated with the connection request, such as: "Urgent mail from User X", "User Y has requested to chat with you", "User Z is attempting to contact your business phone", or the like.

Remote user device 304 may then determine if the established on-demand network connection has been idle for a predetermined amount of time. If remote user device 304 determines that the on-demand network connection that was established to receive the electronic communication from contacting user device 306 has been idle for the predetermined amount of time, then remote user device 304 may then close the on-demand network connection.

Thus, the illustrative embodiments leverage instrumented company servers to establish a mechanism that provides remote workers with various capabilities to receive notifications that establish a network connection. The notification may be initiated by electronic communications coming into an email system, instant messaging system, private branch exchange system, or the like. If the remote worker is not reachable directly from one of these systems, the systems may communicate directly with a company server, which may then recognize those incoming electronic communications as being directed to a person who is working remotely and is not currently connected through a network connection. The company server may then initialize a notification to the user to connect to the network, through a communication device.

Figure 4:
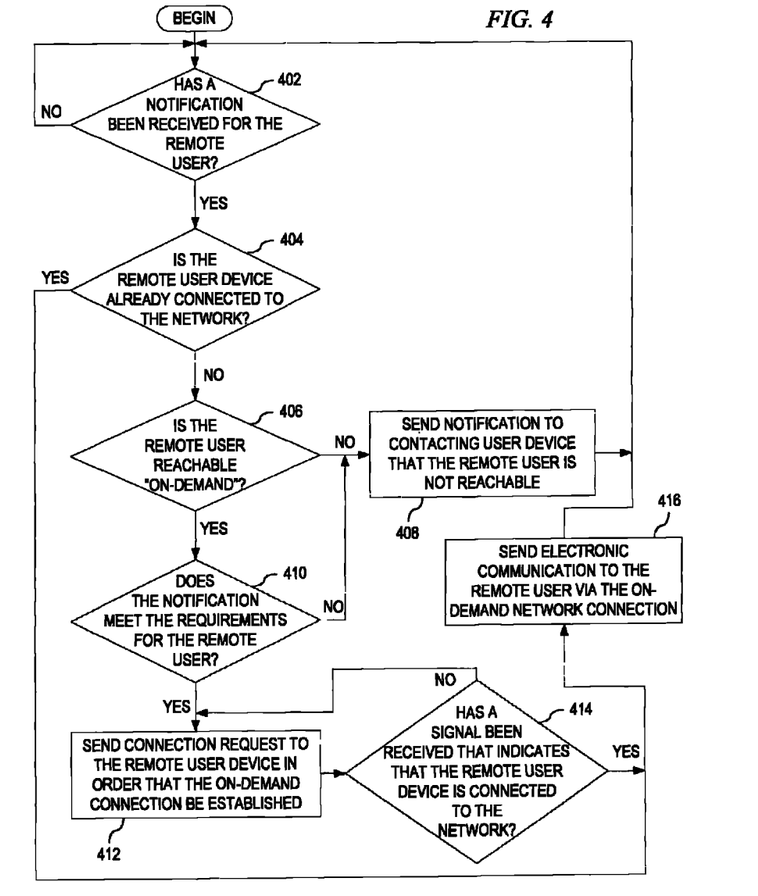
FIG. 4 depicts an example of the operation performed by an instrumented server in an on-demand network connection mechanism in accordance with an illustrative embodiment.

FIG. 4 depicts an example of the operation performed by an instrumented server in an on-demand network connection mechanism in accordance with an illustrative embodiment. As the operation begins, the instrumented server determines if a notification has been received intended for the remote user (step 402). If at step 402 a notification has not been received, then the operation returns to step 402. If at step 402 a notification has been received that is intended for a remote user, then the instrumented server determines if the remote user device is already connected to the network (step 404). If at step 404 the remote user device is not already connected to the network, then the instrumented server determines if the remote user is reachable "on-demand" (step 406). As discussed previously, the remote user may be required to provide an indication to the instrumented server that the remote user is reachable "on-demand".

If at step 406 the instrumented server determines that the user is not reachable "on-demand", then the instrumented server sends a notification to the contacting user device that the remote user is not reachable (step 408), with the operation proceeding to step 402 thereafter. If at step 406 the instrumented server determines that the user is reachable "on-demand," then the instrumented server determines if the notification meets the requirements for the remote user (step 410). The requirements may indicate the types of notification that cause the on-demand network connection to be established, such as names of contacting users, level of urgency of an email, times in which a phone call is received, specific name of a file attached to an email, or the like. If at step 410 the notification does not meet the requirements for the remote user, then the operation proceeds to step 408. If at step 410 the notification meets the requirements for the remote user, then the instrumented server sends a connection request to the remote user device in order than an on-demand connection be established (step 412).

The instrumented server then waits for a signal from the remote user device that indicates that the remote user device is connected to the network (step 414). If at step 414 the instrumented server does not receive a signal from the remote user device that indicates that the remote user device is connected to the network, then the operation returns to step 412. If at step 414 the instrumented server receives a signal from the remote user device that indicates that the remote user device is connected to the network, then the instrumented server sends the electronic communication associated with the notification to the remote user via the on-demand network connection (step 416), with the operation proceeding to step 402 thereafter. Returning to step 404, if the remote user device is already connected to the network, then the operation proceeds to step 416.

Figure 5:
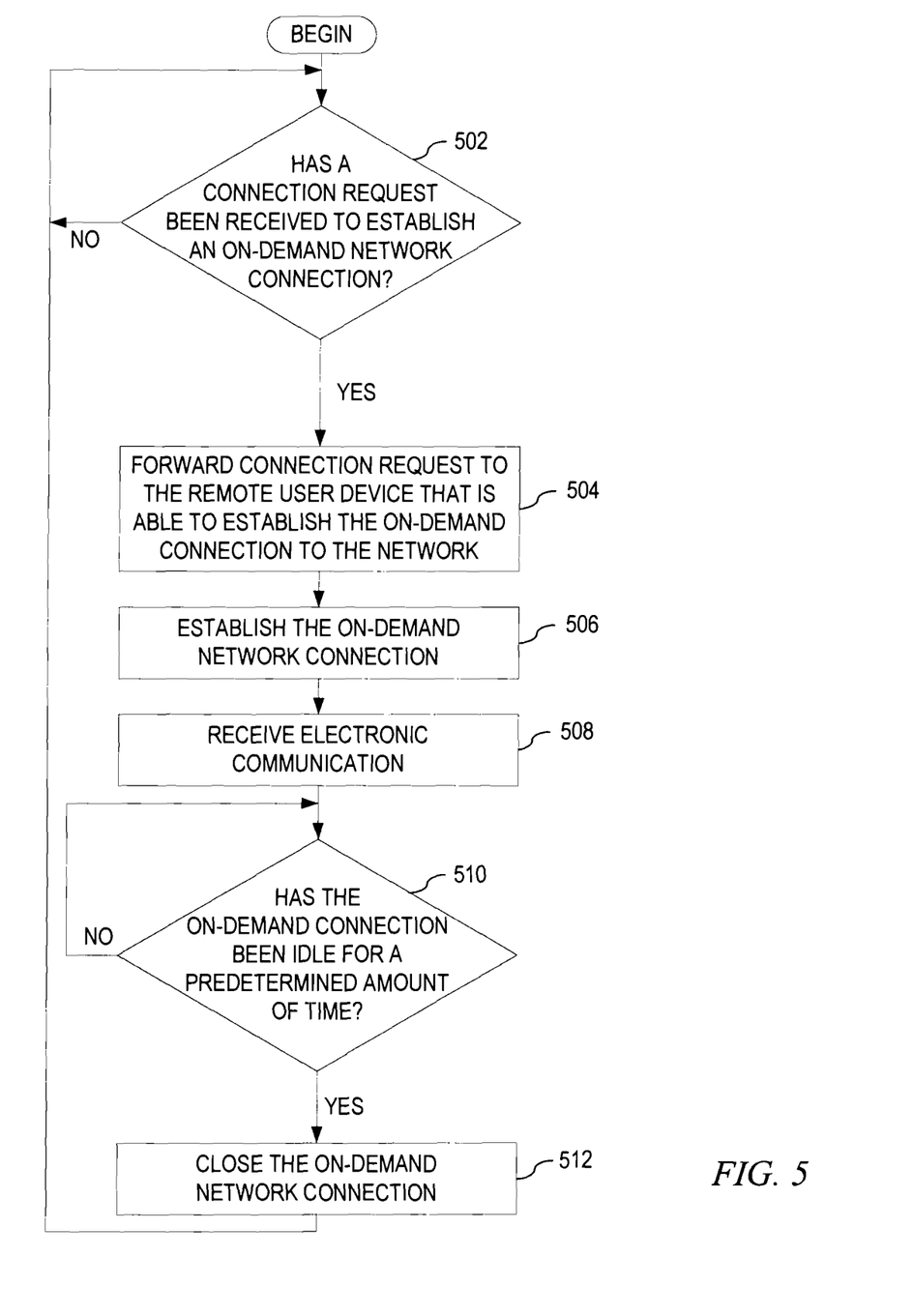
FIG. 5 depicts an example of the operation performed by a relay device and remote user device in an on-demand network connection mechanism in accordance with an illustrative embodiment.

FIG. 5 depicts an example of the operation performed by a relay device and remote user device in an on-demand network connection mechanism in accordance with an illustrative embodiment. In this example, the remote user device is not capable of receiving a connection request directly from the instrumented server and the relay device is not capable of connecting directly to the network. As the operation begins, the relay device determines if a connection request has been received to establish an on-demand network connection from an instrumented server (step 502). If at step 502 a connection request has not been received, then the operation returns to step 502. If at step 502 a connection request has been received, then the relay device forwards the connection request to the remote user device that is able to establish an on-demand network connection (step 504). The remote user device may then automatically establish a network connection to the network or display a notification to the remote user that indicates that a network connection needs to be established, which results in the on-demand network connection being established (step 506). The remote user device then receives the electronic communication from the contacting user device (step 508).

The remote user device then determines if the established on-demand network connection has been idle for a predetermined amount of time (step 510). If at step 510 the remote user device determines that the on-demand network connection has not been idle for the predetermined amount of time, then the operation returns to step 510. If at step 510 the remote user device determines that the on-demand network connection has been idle for the predetermined amount of time, then the remote user device closes the on-demand network connection (step 512), with the operation returning to step 502 thereafter.

Figure 6:
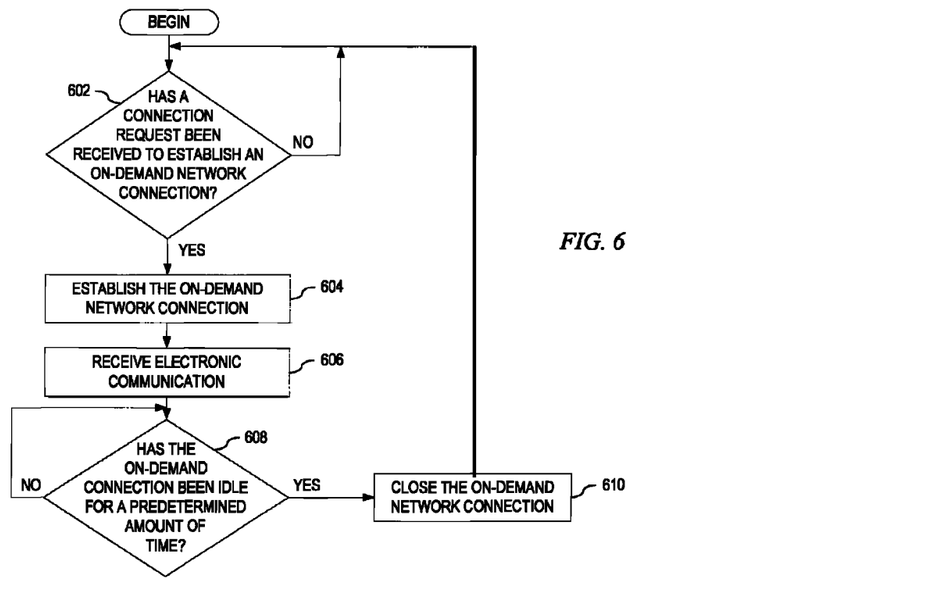
FIG. 6 depicts an example of the operation performed by a remote user device in an on-demand network connection mechanism in accordance with an illustrative embodiment.

FIG. 6 depicts an example of the operation performed by a remote user device in an on-demand network connection mechanism in accordance with an illustrative embodiment. In this example, the remote user device is capable of receiving a connection request directly from the instrumented server and connecting directly to the network. As the operation begins, the remote user device determines if a connection request has been received to establish an on-demand network connection from an instrumented server (step 602). If at step 602 a connection request has not been received, then the operation returns to step 602. If at step 602 a connection request has been received, then the remote user device establishes a network connection to the network or displays a notification to the remote user that indicates that a network connection needs to be established, which results in the on-demand network connection being established (step 604). The remote user device then receives the electronic communication from the contacting user device (step 606).

The remote user device then determines if the established on-demand network connection has been idle for a predetermined amount of time (step 608). If at step 608 the remote user device determines that the on-demand network connection has not been idle for the predetermined amount of time, then the operation returns to step 608. If at step 608 the remote user device determines that the on-demand network connection has been idle for the predetermined amount of time, then the remote user device closes the on-demand network connection (step 610), with the operation returning to step 602 thereafter.

Thus, the illustrative embodiments provide a mechanism for determining an actual need of a network connection and establishing the network connection according to predetermined policies and characteristics for a remote worker. An on-demand network connection may be established when an instrumented company server receives an electronic communication for the remote worker and the remote worker is not currently connected via a network connection. In such cases, the on-demand connection mechanism will trigger a network connection to be established from the remote worker's computing device.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for establishing an on-demand network connection for a remote user, the method comprising:
   responsive to a contacting user device being unable to send an electronic communication to a remote user device directly over a network, receiving, by an instrumented server, a notification from the contacting user device to have the remote user device establish the on-demand network connection to the network in order to send the electronic communication;
   responsive to receiving the notification, determining, by the instrumented server, whether the remote user device is reachable on-demand;
   responsive to the remote user device being reachable on-demand, determining, by the instrumented server, whether the electronic communication from the contacting user device meets a set of requirements for establishing the on-demand-network; and
   responsive to the notification meeting the set of requirements, sending, by the instrumented server, a connection request to the remote user device indicating that the on-demand network connection to the network is to be established, wherein, upon
   receiving the connection request, the remote user device establishes the on-demand network connection from the remote user device to the network and receives the electronic communication via the on-demand network connection to the network.

2. The method of claim 1, wherein the on-demand network connection is established automatically by the remote user device in response to receiving the connection request.

3. The method of claim 1, wherein the on-demand network connection is established after the remote user device displays the notification to a remote user that indicates that the on-demand network connection needs to be established and the remote user acknowledges the notification.

4. The method of claim 1, wherein the connection request is received directly by the remote user device that is capable of establishing the on-demand network connection.

5. The method of claim 1, wherein the connection request is received by a relay device that is not capable of establishing the on-demand network connection and wherein the relay device forwards the connection request to the remote user device that is capable of establishing the on-demand network connection.

6. The method of claim 1, wherein the connection request is received in response to a remote user of the remote user device providing an indication that the remote user is reachable on-demand.

7. The method of claim 1, wherein the set of requirements are set by a remote user of the remote user device and wherein the set of requirements comprise at least one of: the electronic communication originating from a list of contacting users, the electronic communication meets a predetermined level of urgency, the electronic communication is received within a predetermined time period, or the electronic communication includes a file with a pre-identified name.

8. The method of claim 1, further comprising:
   determining, by the remote user device, whether the on-demand network connection to the network has been idle for a predetermined amount of time; and
   responsive to the on-demand network connection being idle for the predetermined amount of time, closing, by the remote user device, the on-demand network connection to the network.

9. A computer program product comprising a non-transitory computer readable medium having a computer readable program recorded thereon, wherein the computer readable program, when executed on a computing device, causes the computing device to:

responsive to a contacting user device being unable to send an electronic communication to a remote user device directly over a network, receiving a notification to have the remote user device establish the on-demand network connection to the network in order to send the electronic communication;

responsive to receiving the notification, determine whether the remote user device is reachable on-demand;

responsive to the remote user device being reachable on-demand, determine whether the electronic communication from the contacting user device meets a set of requirements for establishing the on-demand-network; and responsive to the notification meeting the set of requirements, send a connection request to the remote user device indicating that the on-demand network connection to the network is to be established, wherein, upon receiving the connection request, the remote device establishes the on-demand network connection from the remote user device to the network and receives the electronic communication on the remote user device via the on-demand network connection to the network.

10. The computer program product of claim 9, wherein the on-demand network connection is established either automatically by the remote user device in response to receiving the connection request or after the remote user device displays the notification to a remote user that indicates that the on-demand network connection needs to be established and the remote user acknowledges the notification.

11. The computer program product of claim 9, wherein the connection request is received directly by the remote user device that is capable of establishing the on-demand network connection.

12. The computer program product of claim 9, wherein the connection request is received by a relay device that is not capable of establishing the on-demand network connection and wherein the relay device forwards the connection request to the remote user device that is capable of establishing the on-demand network connection.

13. The computer program product of claim 9, wherein the connection request is received in response to a remote user of the remote user device providing an indication that the remote user is reachable on-demand, wherein the set of requirements are set by a remote user of the remote user device, and wherein the set of requirements comprise at least one of: the electronic communication originating from a list of contacting users, the electronic communication meets a predetermined level of urgency, the electronic communication is received within a predetermined time period, or the electronic communication includes a file with a pre-identified name.

14. The computer program product of claim 9, wherein the computer readable program further causes the computing device to:

determine whether the on-demand network connection to the network has been idle for a predetermined amount of time; and responsive to the on-demand network connection being idle for the predetermined amount of time, close the on-demand network connection to the network.

15. An apparatus, comprising:

a processor; and a memory coupled to the processor, wherein the memory comprises instructions which, when executed by the processor, cause the processor to:

responsive to a contacting user device being unable to send an electronic communication to a remote user device directly over a network, receiving a notification to have the remote user device establish the on-demand network connection to the network in order to send the electronic communication;

responsive to receiving the notification, determine whether the remote user device is reachable on-demand;

responsive to the remote user device being reachable on-demand, determine whether the electronic communication from the contacting user device meets a set of requirements for establishing the on-demand-network; and responsive to the notification meeting the set of requirements, send a connection request to the remote user device indicating that the on-demand network connection to the network is to be established, wherein, upon receiving the connection request, the remote device establishes the on-demand network connection from the remote user device to the network and receives the electronic communication on the remote user device via the on-demand network connection to the network.

16. The apparatus of claim 15, wherein the on-demand network connection is established either automatically by the remote user device in response to receiving the connection request or after the remote user device displays the notification to a remote user that indicates that the on-demand network connection needs to be established and the remote user acknowledges the notification.

17. The apparatus of claim 15, wherein the connection request is received directly by the remote user device that is capable of establishing the on-demand network connection.

18. The apparatus of claim 15, wherein the connection request is received by a relay device that is not capable of establishing the on-demand network connection and wherein the relay device forwards the connection request to the remote user device that is capable of establishing the on-demand network connection.

19. The apparatus of claim 15, wherein the connection request is received in response to a remote user of the remote user device providing an indication that the remote user is reachable on-demand, wherein the set of requirements are set by a remote user of the remote user device, and wherein the set of requirements comprise at least one of: the electronic communication originating from a list of contacting users, the electronic communication meets a predetermined level of urgency, the electronic communication is received within a predetermined time period, or the electronic communication includes a file with a pre-identified name.

20. The apparatus of claim 15, wherein the instructions further cause the processor to:

determine whether the on-demand network connection to the network has been idle for a predetermined amount of time; and responsive to the on-demand network connection being idle for the predetermined amount of time, close the on-demand network connection to the network.

* * * * *